United States Patent [19]

Sundet

[11] Patent Number: 4,544,484

[45] Date of Patent: Oct. 1, 1985

[54] REVERSE OSMOSIS MEMBRANE QUENCHING

[75] Inventor: Sherman A. Sundet, Wilmington, Del.

[73] Assignee: E. I. Du Pont de Nemours and Company, Wilmington, Del.

[21] Appl. No.: 507,897

[22] Filed: Jun. 24, 1983

[51] Int. Cl.$^4$ .................. B01D 13/00; B29D 27/00
[52] U.S. Cl. .................. 210/500.2; 264/41; 264/184; 264/204; 264/209.1
[58] Field of Search .............. 264/184, 41, 182, 209.1, 264/204; 210/500.2

[56] References Cited

U.S. PATENT DOCUMENTS

| | | | |
|---|---|---|---|
| 3,402,234 | 9/1968 | Borie et al. | 264/182 |
| 3,414,645 | 12/1968 | Morgan | 264/184 |
| 3,567,632 | 3/1971 | Richter et al. | 210/23 |
| 3,878,109 | 4/1975 | Ikeda et al. | 264/41 |
| 3,985,934 | 10/1976 | Farrissey et al. | 264/184 |
| 4,070,433 | 1/1978 | Miyoshi et al. | 264/216 |
| 4,087,388 | 5/1978 | Jensen et al. | 264/41 |
| 4,221,903 | 9/1980 | Elfert et al. | 264/184 |
| 4,269,967 | 5/1981 | Elfert et al. | 264/216 |
| 4,340,479 | 7/1980 | Pall | 264/41 |
| 4,342,711 | 8/1982 | Joh et al. | 264/41 |
| 4,378,326 | 5/1983 | Garlington et al. | 264/216 |

OTHER PUBLICATIONS

"Studies on Acrylic Fibers", by Takeda, H., Kogyo Kagaky Zusshi, 67, 630–632 (1964).

*Primary Examiner*—Philip Anderson

[57] ABSTRACT

In the preparation of permselective membranes by extracting a solvent-cast membrane with non-solvent, the improvement of quenching with a polar liquid before extraction.

9 Claims, No Drawings

REVERSE OSMOSIS MEMBRANE QUENCHING

This is a continuation-in-part of U.S. Ser. No. 278,432, filed June 25, 1981, now abandoned.

BACKGROUND OF THE INVENTION

Asymmetric membranes have long been used in a variety of purification operations. Permeation selective or permselective membranes preferentially pass certain components of liquid mixtures while retaining other components. In reverse osmosis membranes, a hydrostatic pressure in excess of the equilibrium osmotic pressure of the liquid mixture or solution is applied to the liquid to force more permeable components, usually water, through the membrane in preference to less permeable components, such as salt, contrary to normal osmotic flow.

In preparation of membranes for these applications, a film or hollow fiber is first cast from a casting dope or solution of polymer, solvent and salt; and the solvent and salt are then separated from the polymer to yield a membrane. Effort has long been directed toward improvement of this process to increase the flux and salt rejection of the membranes.

SUMMARY OF THE INVENTION

The instant invention provides an improvement in the process for preparing reverse osmosis membranes which yields improvement in the membrane characteristics during subsequent processing.

Specifically, the instant invention provides a process for preparing permselective membranes comprising the steps of casting a film or hollow fiber from a solution including polymer and organic solvent for the polymer; contacting the cast film or hollow fiber with an aqueous quenching liquid for a period of about 5 seconds to 5 minutes, the quenching liquid comprising about from 5 to 50 weight percent of at least one polar liquid selected from the group consisting of carbonyl compounds of the general formula

A—C—B wherein A is H, $NH_2$, $CH_3$, or $CH_2CH_3$ and B is OH, $NH_2$, or $CH_3$; and then immersing the quenched film or hollow fibers in water for a time necessary to extract substantially all of the polar liquid from the film or hollow fiber.

DETAILED DESCRIPTION OF THE INVENTION

The instant invention is applicable to those polymeric reverse osmosis membranes previously used in the art. The typical preparation of these polymers involves first casting a "proto-membrane" consisting of polymer, organic polar solvent, and, in general, dissolved salt and water. The proto-membrane is then extracted by contacting it with water which water frequently serves as a storage medium for the finished membrane. Such polymers and their preparation are described in detail in Richter et al., U.S. Pat. No. 3,567,632, hereby incorporated by reference. The polymer eligible for use in practice of this invention is disclosed in that patent and is synthetic organic nitrogen-linked aromatic polymer represented by the formula:

—(LR)₂— where
(1) each L independently is a divalent linking group of the formula —($D_iE_jD_kE_lD_m$)— wherein
(i) D is

and E is

or vice versa: each X independently is O or S; each Z independently is H, lower alkyl, or phenyl, provided that at least about ¼ of the Z's in the polymer are H; and all non-terminal

's occur in pairs;
(ii) i and j each represent the numerals 1 or 2, k, l, and m each represent the numerals 0, 1, or 2; provided that if l=0, then m=0; and if k=0, then l=0; and further that i+j+k+l+m≦8;
(2) each R independently is a divalent organic radical, both of whose terminal atoms are carbon atoms, at least about ½ of all such terminal atoms bonded to

and at least about ⅔ of all such terminal atoms bonded to

and the L links being members of aromatic nuclei; and such that
(i) $(\overline{N}_R)/(\overline{s})$ is less than about 10,
(ii) $f_M$ is less than about 1/5, and
(iii) P.I. is less than about 1/500,
where:
$N_R = N_R° - 10N_1 - N_H$
$N_R°$ = (number of atoms in R, exclusive of H-atoms) ≦ 50
$N_1$ = number of ionic groups in R
$N_H$ = number of H-bonding units contributed by polar groups in R
$\overline{N}_R$ = average value of $N_R$ for the polymer,
$\overline{s} = \frac{1}{2}$[(number of

groups in L) + 1]

$\overline{s}$ = average value of s for the polymer $$f_m = \frac{\text{(number of single-strand —M—}}{\text{links in the polymer/chain)}}{\text{(total number of atoms, exclusive of H-atoms in polymer chain)}}$$

M = any atom in R linking the polymer chain solely through two single bonds, $$P.I. = \frac{\text{(total number of pendent ionic groups in the polymer)}}{\text{(polymer molecular weight)}};$$

(3) n is an integer sufficiently large to provide film-forming molecular weight; and (4) the polymer has a solubility of at least about 10% by weight in a medium consisting of 0–3% by weight of lithium chloride in a solvent selected from the group consisting of dimethylacetamide, dimethyl sulfoxide, N-methyl pyrrolidone, hexamethyl phosphoramide, and mixtures thereof at 25° C.

The present invention is based on the discovery that the extraction step in the preparation of a permselective membrane is facilitated and the final properties of the membrane are improved if the membrane is quenched prior to the extraction step, with a quenching liquid containing about 5–50 weight percent of certain polar compounds in water. These polar compounds are carbonyl compounds of a general formula

wherein A is H, $NH_2$, $CH_3$, or $CH_2CH_3$ and B is OH, $NH_2$, or $CH_3$. Representative carbonyl compounds which can be used in the instant invention include formic acid, acetic acid, formamide and urea. Of these, formic acid, formamide, and urea are preferred, and formic acid provides a particularly outstanding combination of performance characteristics, ease of handling and ready availability.

The concentration of the above compounds in the quenching liquid should be about from 5 to 50 weight percent. The concentration is preferably about 20 to 40 weight percent for quenching flat membranes and about 5 to 20 weight percent for quenching hollow fibers. Less than 5 weight percent does not generally provide a significant benefit to the overall process, while concentrations in excess of 50 weight percent result in decline in the performance characteristics of the final permselective membrane. The polar compounds are highly water soluble and the quenching liquid is made by merely dissolving the polar compounds in water to the proper proportions.

In the practice of this invention, proto-membranes should be contacted with the quenching liquid for a period of about from 5 seconds to 15 minutes. A period of about from 5–20 seconds is generally preferred to minimize the degree of solvent and salt extraction in the quenching stage. Contact times in excess of 15 minutes generally result in a modification of the polymer structure which modification results in a weaker membrane, having reduced mechanical stability and reduced flux and rejection characteristics in extended use.

The process of this invention can be practiced in a wide range of temperatures extending from the freezing point of the liquid in this membrane manufacturing system up to the temperature used for drying the membrane. Preferably, a temperature from about 10° to 30° C. is used.

The process of the instant invention results in membranes having particularly high flux and improved performance after long-term use at elevated temperatures. These benefits are due, in part, to the quenching step of the instant process, which is believed to set or stabilize the membrane prior to the final extraction step.

The invention is further illustrated by the following specific examples, in which parts and percentages are by weight unless otherwise indicated.

EXAMPLE 1 AND COMPARATIVE EXAMPLES A–B

For Example 1 and Comparative Examples A and B, an aromatic copolyamide was prepared from m-phenylene diamine and m-phenylene diamine-4-sulfonic acid (8/2 mole ratio) with isophthaloyl and terephthaloyl chlorides (7/3 mole ratio) with an inherent viscosity at 35° C. of 0.75 dl/g (0.5% in DMF). 20 parts of the polyaramide and 11 parts of $MgCl_2.6H_2O$ were dissolved in 80 parts of dimethylformamide and the resulting solution filtered through a filter of 5 micron porosity.

From this solution, membranes were cast on a glass plate at 95° C., and dried for 120 seconds. The membranes were cooled in air for 90 seconds and then contacted for 15 minutes with formic acid quenching liquid or water, as indicated below. The membranes were, then, extracted in water at room temperature for 45 minutes, followed by annealing in water at 60° C. for 30 additional minutes. The membranes were stored in water until tested.

The membranes were tested for reverse osmosis performance in stirred monel cells using salt solutions at concentrations of 1.5 to 3.2 g/l at pressures up to 800 psi. Fractional rejection of salt and the flux constant of the water, reported in m/s.TPa, were calculated from the conductivity of the permeate water and its rate of flow through the membrane. The results are summarized in the following Table I.

TABLE I

| Example | Quench Medium | As prepared Rejection | As prepared Flux Constant | After 140 hrs in $H_2O$ Rejection | After 140 hrs in $H_2O$ Flux Constant |
|---|---|---|---|---|---|
| A | Water at 4° C. for 15 mins | 0.986 | 1.32 | 0.958 | 1.00 |
| B | 85% Formic acid at 5° C. for 15 mins | 0.955 | 0.75 | 0.938 | 0.65 |
| 1 | 50% Formic acid at 5° C. for 15 mins | 0.979 | 1.63 | 0.959 | 1.47 |

The membrane quenched in 50% formic acid before extraction not only exhibits higher flux levels as prepared but sharply better performance on aging.

EXAMPLES 2–4 AND COMPARATIVE EXAMPLES C–D

A series of membranes was prepared and tested substantially as in Example 1 except that the concentration of formic acid was varied. The results are summarized in the following Table II.

TABLE II

| Example | Quench Medium (5° C.) | As prepared Rejection | As prepared Flux Constant | After 132 hrs at 55° C. Rejection | After 132 hrs at 55° C. Flux Constant |
|---|---|---|---|---|---|
| C | Water | 0.981 | 1.334 | 0.922 | 1.067 |
| D | 65% Formic acid | 0.979 | 1.185 | | |
| 2 | 50% Formic acid | 0.982 | 1.945 | 0.954 | 1.544 |
| 3 | 40% Formic acid | 0.976 | 2.022 | 0.952 | 1.620 |
| 4 | 25% Formic acid | 0.984 | 2.174 | 0.956 | 1.549 |

Membranes prepared according to the present invention exhibit superior flux both as prepared and after aging.

EXAMPLES 5 & 6

The general procedure of Example 1 was repeated, except that the membranes were quenched in 35% formic acid for a very short period. The results are summarized in the following Table III.

TABLE III

| Example | Quench Period | As prepared Rejection | As prepared Flux Constant | After 132 hrs at 55° C. Rejection | After 132 hrs at 55° C. Flux Constant |
|---|---|---|---|---|---|
| 5 | 1 sec | 0.972 | 2.045 | 0.948 | 1.897 |
| 6 | 4 secs | 0.966 | 2.182 | 0.949 | 2.018 |

COMPARATIVE EXAMPLE E AND EXAMPLES 7-12

A series of hollow fiber samples were spun by standard dry spinning techniques followed by immediate in-line contact with formic acid quenching liquid or water. The spinning rate was 20 m/min through a 1 meter long drying cell kept at 175°-180° C. The solution temperature at the spinneret was 125±1° C. The solution was pumped through a one hole spinneret at the rate of 10 cc/hour. The solution viscosity was 810 poises at 120° C. The fibers were assembled into test permeators and evaluated. The results are summarized in the following Table IV, together with the outer and inner diameters of the fibers in microns.

TABLE IV

| Example | % Formic Acid in Quench Bath | Outer Diameter | Inner Diameter | Rejection | Flux Constant |
|---|---|---|---|---|---|
| E | 0 | 101 | 30 | 0.896 | 0.32 |
| 7 | 4.2 | 104 | 38 | 0.955 | 0.60 |
| 8 | 10.4 | 100 | 35 | 0.942 | 0.68 |
| 9 | 14.5 | 113 | 35 | 0.895 | 0.58 |
| 10 | 20.4 | 113 | 39 | 0.930 | 0.43 |
| 11 | 28.6 | 114 | 33 | 0.850 | 0.25 |
| 12 | 40.0 | 117 | 31 | 0.380 | 0.14 |

EXAMPLES 8-25 AND COMPARATIVE EXAMPLE F

A copolyaramide was prepared from m-phenylene diamine and isophthalic and terephthalic acids in the ratio of 70/30, with one-fifth of the diamine residues sulfonated in the 4-position to give a copolyaramide with 2.5 weight % sulfur. Its inherent viscosity, as determined at 35° C. at 0.5 g/100 ml of dimethyl formamide was 0.75-0.8 dl/g.

The copolyaramide was dissolved (18 parts by weight) with 10.3 parts of $MgCl_2.6H_2O$ in 71.7 parts of dimethyl formamide and the resulting solution then filtered through a 5 micron filter.

Membranes were cast on a glass plate at 95° C. with a Gardner knife at varying thickness, dried under a stream of nitrogen, and quenched in an aqueous medium before extracting overnight in distilled water. In Comparative Example F, the water was substituted for the quenching liquid. After extracting and annealing in water for four hours at the temperatures indicated in Table V, the permeability properties of the membranes were determined in stirred cells, with a feed solution containing 3.5 grams per liter of sodium chloride. The data shown were obtained at 22°-3° C. and 800 psi pressure, and are expressed as R/Kw, where the rejection, R, is the fraction of the salt that is turned back by the membrane, and Kw, in meters per second per TeraPascal, is the hydraulic permeability constant.

TABLE V

| Example | Cast mils | Dry mins | Quench Additive | % | Annealed at 55° C. | Annealed at 65° C. | Annealed at 75° C. |
|---|---|---|---|---|---|---|---|
| F | 15 | 2 | — | — | | .983/1.48 | |
| 8 | " | " | Formic Acid | 35 | .983/3.82 | .983/2.85 | |
| 9 | 11 | 2 | " | 25 | | .984/2.53 | |
| 10 | " | " | " | 45 | | .988/2.12 | |
| 11 | " | 2.5 | " | 35 | | | .985/2.06 |

| | | | | | 60° C. | 70° C. | |
|---|---|---|---|---|---|---|---|
| 12 | " | 2 | " | 35 | .978/2.21 | .973/1.90 | |
| 13 | " | " | Acetic Acid | 45 | .976/2.28 | .961/1.61 | |
| 14 | " | " | Propionic Acid | 56 | .976/200 | .940/1.78 | |
| 15 | 15 | 3 | Acetone | 20 | .982/1.83 | | |
| 16 | " | " | " | 28 | .992/2.10 | | |
| 17 | " | " | " | 40 | .985/2.37 | | |
| 18 | " | " | " | 45 | .947/2.71 | .971/1.83 | |
| 19 | " | " | " | 55 | .861/2.21 | .940/1.31 | |
| 20 | " | 2 | — | — | .975/1.64 | | |
| 21 | " | " | Formamide | 20 | .993/2.61 | | |
| 22 | " | " | Acetamide | " | .995/2.29 | | |
| 23 | " | " | Formamide | 35 | .980/4.21 | .985/3.37 | |
| 24 | " | 2 | Urea | 30 | .992/2.64 | | |
| 25 | " | " | " | 40 | .970/2.91 | | |
| 26 | " | " | " | 50 | .986/2.52 | | |
| 27 | " | " | Propionamide | 20 | .995/2.23 | | |

I claim:
1. A process for preparing permselective membranes comprising the steps of casting a film or hollow fiber from a solution including: (a) synthetic organic nitrogen-linked aromatic polymer represented by the formula:

—(LR)$_2$— where
(1) each L independently is a divalent linking group of the formula —(D$_i$E$_j$D$_k$E$_l$D$_m$)— wherein
(i) D is

and E is

or vice versa: each X independently is O or S; each Z independently is H, lower alkyl, or phenyl, provided that at least about $\frac{1}{4}$ of the Z's in the polymer are H; and all non-terminal

's occur in pairs;

(ii) i and j each represent the numerals 1 or 2, k, l, and m each represent the numerals 0, 1, or 2; provided that if $l=0$; then $m=0$; and if $k=0$, then $l=0$; and further that $i+j+k+l+m \leq 8$;

(2) each R independently is a divalent organic radical, both of whose terminal atoms are carbon atoms, at least about $\frac{1}{2}$ of all such terminal atoms bonded to

and at least about $\frac{2}{3}$ of all such terminal atoms bonded to

and the L links being members of aromatic nuclei; and such that (i) $(\overline{N_R})/(\overline{s})$ is less than about 10,
(ii) $f_M$ is less than about 1/5, and
(iii) P.I. is less than about 1/500,
where:
$N_R = N_R° - 10N_1 - N_H$
$N_R° =$ (number of atoms in R, exclusive of H-atoms)
$N_1 =$ number of ionic groups in R
$N_H =$ number of H-bonding units contributed by polar groups in R
$\overline{N_R} =$ average value of $N_R$ for the polymer,
$s = \frac{1}{2}$[(number of

groups in L)+1]

$\bar{s}$ = average value of $s$ for the polymer $f_m = \dfrac{\text{(number of single-strand —M— links in the polymer/chain)}}{\text{(total number of atoms, exclusive of H-atoms in polymer chain)}}$ $M$ = any atom in R linking the polymer chain solely through two single bonds, $P.I. = \dfrac{\text{(total number of pendent ionic groups in the polymer)}}{\text{(polymer molecular weight)}}$;

(3) n is an integer sufficiently large to provide film-forming molecular weight; and
(4) the polymer has a solubility of at least about 10% by weight in a medium consisting of 0–3% by weight of lithium chloride in a solvent selected from the group consisting of dimethylacetamide, dimethyl sulfoxide, N-methyl pyrrolidone, hexamethyl phosphoramide, and mixtures thereof at 25° C.; and (b) organic solvent for the polymer; contacting the cast film or hollow fiber with an aqueous quenching liquid for a period of about from 5 seconds to 15 minutes, the quenching liquid comprising about from 5 to 50 weight percent of at least one polar liquid selected from the group consisting of carbonyl compounds of the general formula

wherein A is H, $NH_2$, $CH_3$, or $CH_2CH_3$ and B is OH, $NH_2$, or $CH_3$; and then immersing the quenched film or hollow fiber in water for a time necessary to extract substantially all of the polar liquid from the film or hollow fiber.

2. A process of claim 1 wherein the polar liquid consists essentially of formic acid.

3. A process of claim 1 wherein the polar liquid consists essentially of formamide.

4. A process of claim 1 wherein the polar liquid consists essentially of urea.

5. A process of claim 1 wherein the polar liquid consists essentially of acetone.

6. A process of claim 1 wherein the aqueous quench solution is maintained at a temperature of about from 10° to 30° C.

7. A process of claim 1 wherein the membrane is in the form of a hollow fiber and the aqueous quenching liquid comprises about from 5 to 20 weight percent polar liquid.

8. A process of claim 1 wherein the membrane is in the form of a flat sheet and the aqueous quenching liquid comprises about from 20 to 40 weight percent polar liquid.

9. A semipermeable membrane resulting from the process of claim 1.

* * * * *